(12) United States Patent
Pfeifer et al.

(10) Patent No.: US 7,424,470 B2
(45) Date of Patent: Sep. 9, 2008

(54) LOCAL DATA REPOSITORY GENERATION

(75) Inventors: Wolfgang Pfeifer, Kerzenhelm (DE); Stefan Sigg, Nussloch (DE); Stefan Biedenstein, Nussloch (DE)

(73) Assignee: SAP AG, Walldorf (DE)

( * ) Notice: Subject to any disclaimer, the term of this patent is extended or adjusted under 35 U.S.C. 154(b) by 341 days.

(21) Appl. No.: 10/843,958

(22) Filed: May 11, 2004

(65) Prior Publication Data

US 2005/0256896 A1    Nov. 17, 2005

(51) Int. Cl.
 G06F 7/00    (2006.01)
 G06F 17/30    (2006.01)
 G06F 17/00    (2006.01)
(52) U.S. Cl. .................. 707/3; 707/103 R; 707/102
(58) Field of Classification Search .............. 707/3
 See application file for complete search history.

(56) References Cited

U.S. PATENT DOCUMENTS

| | | | |
|---|---|---|---|
| 5,915,240 A * | 6/1999 | Karpf | 705/2 |
| 6,003,039 A * | 12/1999 | Barry et al. | 707/103 R |
| 6,151,601 A * | 11/2000 | Papierniak et al. | 707/10 |
| 6,651,062 B2 * | 11/2003 | Ghannam et al. | 707/10 |
| 2002/0116213 A1 * | 8/2002 | Kavounis et al. | 705/1 |
| 2003/0093424 A1 * | 5/2003 | Chun et al. | 707/7 |
| 2004/0068429 A1 * | 4/2004 | MacDonald | 705/10 |

OTHER PUBLICATIONS

"About OLAP data sources for PivotTable and PivotChart reports", http//:msdn.microsoft.com/library/en-us/off2000/html/xlconAboutOLAPDataS.asp?frame=true.
"Delivering a Connectivity Solution for SAP Business Information Warehouse", Simba Technologies, Inc., http://www.simba.com/Customers/casestudy$_{13}$sap.htm.
"Why Business Intelligence Needs a CubeSlice", The Local Cube Information Center, http//www.localcubetask.com/needcubeslice.htm.
"Local Cubes in a Business Intelligence Strategy", The Local Cube Information Center, http://www.localcubetask.com/bistrat.htm.
"Using the OLAP Client Management System to Bring OLAP Cubes into Multiple Languages", The Local Cube Information Center, http://www.localcubetask.com/translation.htm.
"Use Analysis Server Roles to Define Local Cubes", The Local Cube Information Center, http://www.localcubetask.com/roles.htm.

* cited by examiner

*Primary Examiner*—Debbie M Le
*Assistant Examiner*—Mariela D Reyes
(74) *Attorney, Agent, or Firm*—Mintz, Levin, Cohn, Ferris, Glovsky and & Popeo, P.C.

(57) ABSTRACT

Systems and techniques relating to local data repository generation facilitate analysis of business activity information. In general, in one implementation, a technique includes: receiving results of an analysis query applied against a business information warehouse, the results including at least one key performance indicator generated in response to the analysis query by an analytical engine of the business information warehouse from other information stored in underlying databases of the business information warehouse; transforming the results such that the results appear to be obtained directly from an underlying relational database source; and sending the transformed results to a software component that generates from the transformed results a local data repository, a self-describing collection of integrated records, wherein the local data repository supports dynamic analytical processing operations on the results of the analysis query.

19 Claims, 4 Drawing Sheets

LOCAL DATA REPOSITORY GENERATION

BACKGROUND

The following description relates to systems and techniques for analyzing and presenting business activity information, for example, generating local subsets of large accumulations of business activity information.

Data warehousing involves combining multiple different databases across a business enterprise, frequently as a collection of data designed to support management decision making. Business information warehouse systems can pull data from multiple back-end systems in an enterprise, and combine the data to present a coherent picture of business conditions at a point in time. Business information warehouse systems have been integrated with third party applications to facilitate use of the business information warehouse functionality. For example, the SAP® Business Warehouse (BW) system provided by SAP AG of Walldorf, Germany, has been integrated with the Excel application program provided by Microsoft Corporation of Redmond, Wash. Moreover, the SAP® BW system provides open interfaces for connecting with third party systems and software, including providing OLE (Object Linking and Embedding) DB (Database) for OLAP (Online Analytical Processing) connectivity to underlying proprietary data sources, and providing an open hub service to transport data from the underlying proprietary data sources to other systems as relational tables or flat files.

In addition, the SAP® BW system has provided offline access to BW data by enabling precalculation of reports. Such precalculated reports constitute generally static output data, in the form of an HTML (HyperText Markup Language) file or file cluster, which can be copied to local disk. The local copy of a precalculated report can be accessed while offline and may include some interactive elements, such as a drop down box that allows switching among sales regions presented in a report; but such reports do not provide generic navigation capabilities within the offline data set, such as is possible using OLAP navigation (slicing, dicing, pivoting, etc.) while online.

SUMMARY

Systems and techniques relating to local data repository generation facilitate analysis of business activity information. Business information can be consistently extracted from a business information warehouse and stored in a local repository, which can support offline analysis operations and improved access and operational speed. According to an aspect, a technique includes: receiving results of an analysis query applied against a business information warehouse, the results including at least one key performance indicator generated in response to the analysis query by an analytical engine of the business information warehouse from other information stored in underlying databases of the business information warehouse; transforming the results such that the results appear to be obtained directly from an underlying relational database source; and sending the transformed results to a software component that generates from the transformed results a local data repository, a self-describing collection of integrated records, wherein the local data repository supports dynamic analytical processing operations on the results of the analysis query.

According to another aspect, a system includes: a business information warehouse including an analytical engine and an information provider including a structural definition of information stored in underlying relational databases of the business information warehouse; and a local repository generator that applies an analysis query against the business information warehouse through the analytical engine and the information provider, receives multidimensional results of the analysis query, and generates a multidimensional local data repository by transforming the multidimensional results into a relational data source format used by a software component corresponding to a format of the multidimensional local data repository, wherein the multidimensional results comprise at least one key performance indicator generated in response to the analysis query by the analytical engine from other information stored in the underlying relational databases.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1:
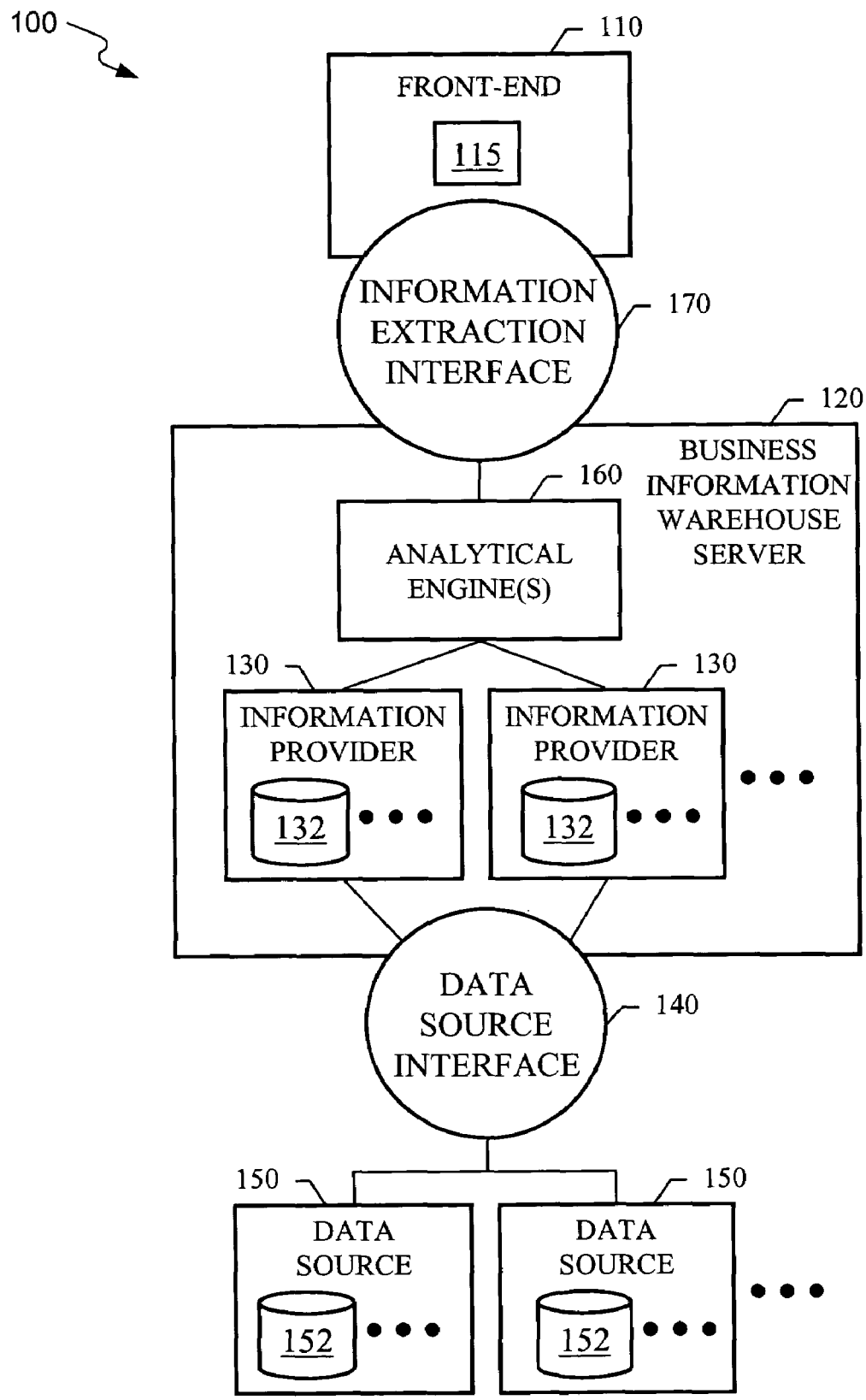
FIG. 1 is a block diagram illustrating a business information warehouse system.

FIG. 1 is a block diagram illustrating a business information warehouse system 100. The system 100 includes a front-end system 110 and a business information warehouse. The business information warehouse includes a business information warehouse server 120 (e.g., the SAP® BW server provided by SAP AG of Walldorf, Germany) and multiple back-end data source systems 150, which can include multiple underlying databases 152. The front-end system 110 can be one or more client computers having a graphical user interface and an application process, such as a spreadsheet application 115 (e.g., the Excel application program provided by Microsoft Corporation of Redmond, Wash.). When the front-end system 110 is online, the front-end system and the business information warehouse are interconnected by a network, allowing data communication between the two. When a front-end system 110 is operating on offline data, the network may be temporarily unavailable (e.g., while analyzing business information on an airplane) or use of the network to interact with information from the business information warehouse may be undesirable (e.g., analyzing business information during a high profile presentation, where relying on network connectivity during the presentation may be problematic, and speed/response time may be very important).

The business information warehouse server 120 provides a data source interface 140 to obtain information from the data source systems 150. The source systems 150 can be multiple different enterprise data collection/management systems and applications, and the interface 140 can include multiple different interface components, such as XML (eXtensible Markup Language) interface components, database connectors, and one or more business application programming interface (BAPI) components, which provide a set of methods for accessing business objects defined in the system 100. For example, a database 152 can be an underlying relational database accessed using BAPI.

The business information warehouse server 120 includes information providers 130, which can include multiple underlying databases 132. An information provider 130 includes a structural definition of information stored in underlying databases of the system 100. These underlying databases can include both underlying relational databases 132 and underlying relational databases 152 (e.g., relational tables), and application of an analysis query to an information provider 130 in the system 100 can result in multiple database queries, such as SQL (structured query language) statements, being generated. An information provider 130 represents a logical source of business information as defined in the system 100, and thus an information provider 130 includes one or more business information objects, such as ODS (operational data store) objects and InfoCubes. In general, an information provider 130 represents a multidimensional data source (e.g., a snapshot of one or more relational databases, restructured into dimensional data) supporting multidimensional slicing and dicing of business information for analysis.

The system 100 also includes one or more analytical engines 160, which are used in generating results in response to an analysis query applied against the business information warehouse. The analytical engine(s) 160 can be part of an online analytical processing (OLAP) component of the business information warehouse server 120. The analytical engine(s) 160 obtain information from one or more information providers 130, as defined by an analysis query, and expose the obtained information as multidimensional data available for dynamic analysis. The analysis query can include filter conditions and can be defined in the business information warehouse server 120 by a person (e.g., and administrator). The analysis query can be designated by a query name maintained in the business information warehouse server 120. A front-end system 110 can include a business analyzer addin for a software application, such as Excel, creating a front-end tool used to present and analyze business information warehouse data when online.

Additionally, the system 100 includes an information extraction interface 170 that enables generation of local data repositories to facilitate analysis of business activity. The information extraction interface 170 can include a component in the business information warehouse server 120, a component in a front-end system 110, or both. For example, the information extraction interface 170 can include a server component in the business information warehouse server 120 that executes analysis queries, and a client component in a front-end system 110 that directs transformation of results received from the server component, such as described further below in connection with FIGS. 3 and 4.

The information extraction interface 170 operates through the analytical engine(s) 160 and can thus provide the full range of business information provided by the business information warehouse server 120 during online analysis, including key performance indicators calculated by the analytical engine(s) 160 in response to an analysis query applied against one or more information providers 130. Information extraction can be performed in response to a direct request or can be scheduled for periodic batch processing. A front-end system 110 can include a server process used to automatically generate one ore more local data repositories to facilitate analysis of business activity; generation of a local data repository can be initiated within an information broadcasting component of the business information warehouse, such as by calling an RFC (remote function call) server running on the front-end system, such as described below.

Figure 2:
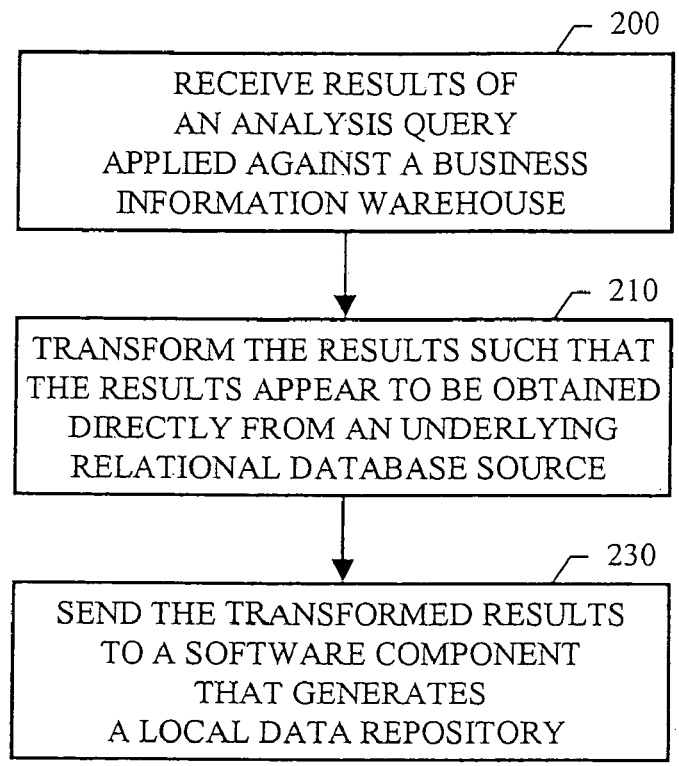
FIG. 2 is a flow chart illustrating generation of a local data repository from information in a business information warehouse system.

FIG. 2 is a flow chart illustrating generation of a local data repository from information in a business information warehouse system. Results of an analysis query applied against a business information warehouse are received at 200. The results include at least one key performance indicator (KPI) generated in response to the analysis query by an analytical engine of the business information warehouse from other information stored in underlying databases of the business information warehouse. Thus, the local data repository to be generated from these results can include high value KPIs, such as a dynamically calculated return on investment KPI, that are not stored in underlying databases but rather are defined by the analysis query. Moreover, because the information being pulled from the business information warehouse is obtained using the same channels used during online analysis operations, a local repository generator can ensure that the information comes consistently out of the business information warehouse.

The results are transformed at 210, such that the results appear to be obtained directly from an underlying relational database source. Transformation of the results can be performed according to the analysis query and according to the structural definition of an information provider in a business information warehouse server. The results of the analysis query are restructured and presented as though they are the results of directly accessed underlying database tables. For example, a result set of an analysis query can include both record information, resulting from a combination of multiple underlying databases, and calculated KPIs, resulting from defined analytical processing operations having been performed on the record information; and this result set is restructured to make the calculated KPIs appear to be part of the original record information.

The transformation can be conditional. For example, transforming the results can be conditioned on a multidimensional data analysis subspace defined by the analysis query falling below a defined threshold. For example, the resulting data file may be limited to being no larger than one hundred megabytes. In some implementations, the local data repository can be viewed as a focused, personalized mini-data-mart (e.g., a file size less than two megabytes).

The transformed results are sent to a software component at 230. The software component can be a third party software component that provides generic call level interfaces used to extract data directly from database tables. The software component generates from the transformed results a local data repository representing a multidimensional, self-describing collection of integrated records, and the local data repository supports dynamic analytical processing operations on the results of the analysis query. Thus, a multidimensional data analysis subspace can be stored locally on a client machine, providing a consistent subset of business warehouse information for offline, dynamic analysis.

Figure 3:
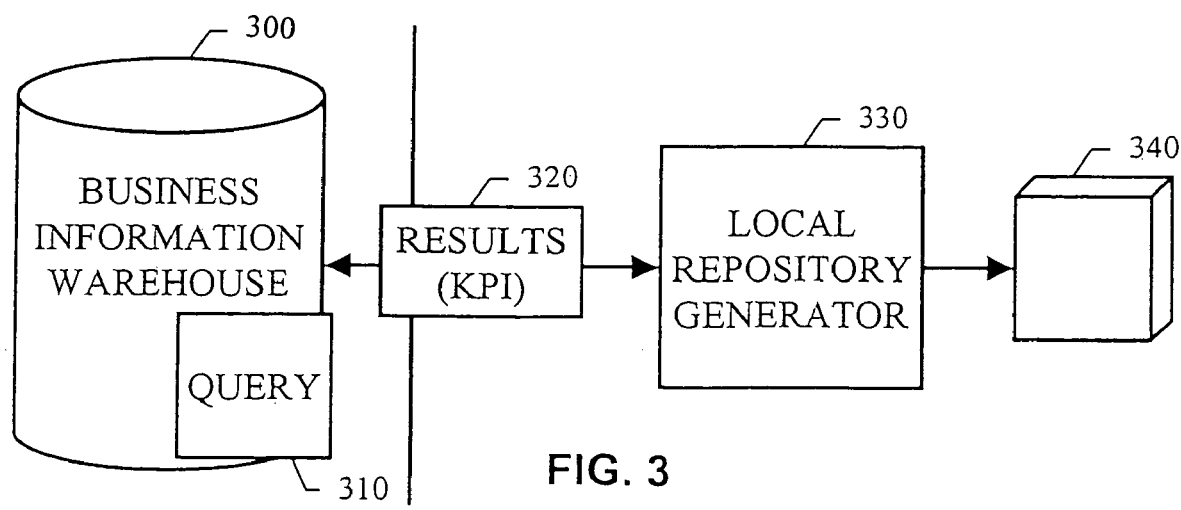
FIG. 3 is a block diagram illustrating generation of a local data repository from information in a business information warehouse system according to an example implementation.

FIG. 3 is a block diagram illustrating generation of a local data repository from information in a business information warehouse system according to an example implementation. A business information warehouse 300 has a corresponding analysis query 310 that is a structural definition of a multidimensional data analysis subspace of data from the business information warehouse 300. The analysis query 310 represents both a set of data and the scope of analysis that can be performed on that data. A local repository generator 330 interacts with the business information warehouse 300 to create a local data repository 340. The local data repository 340 can be stored in a defined local data-mart format supported by multiple client-side business information reporting tools (e.g., a local cube format, such as the .cub format).

When the analysis query 310 is applied in the business information warehouse 300, results 320, including a KPI as described above, are provided to the local repository generator 330. Application of the analysis query 310 and provision of the results 320 can be performed in two separate stages: the first to acquire metadata from the business information warehouse 300, and the second to acquire corresponding business data from the business information warehouse 300.

The local repository generator 330 can be a software component running as a web service in an Internet Information Server environment, and communications between the business information warehouse 300 and the local repository generator 330 can be performed using SOAP (Simple Object Access Protocol). A .Net connector of the business information warehouse 300 can be used for BAPI access, or RFC access to BAPI extraction modules of the business information warehouse (BIW) 300 can be provided.

The local repository generator 330 can include multiple modules that handle various subtasks. For example, (1) an extraction generator module can create an MDX (Multi-Dimensional Expression) statement used for extracting data, (2) a Web Services wrapper module can wrap up extraction functions, (3) a cube create module can generate a local cube structure based on structure information input, and create the corresponding local cube at runtime, (4) a call sequence module can extract data from specified information providers based on a generated MDX statement in a recordset (e.g., using MDDATASET BAPI) to build an in-memory rowset used by an integration module, (5) an insert-into-cube module can build an insert into cube statement at runtime and execute it, and (6) the integration module can provide functionality and user interfaces (e.g., via open hub in an SAP® BIW system) to define and schedule local cube generation activity and to distribute results. The extraction generator module can also check filter conditions to ensure that the amount of data to be extracted falls under a desired limit. Moreover, in an SAP® BIW implementation, the extraction generator module and the integration module can be implemented in the Advanced Business Application Programming (ABAP/4) language, and the other modules can be implemented in the C# language.

Figure 4:
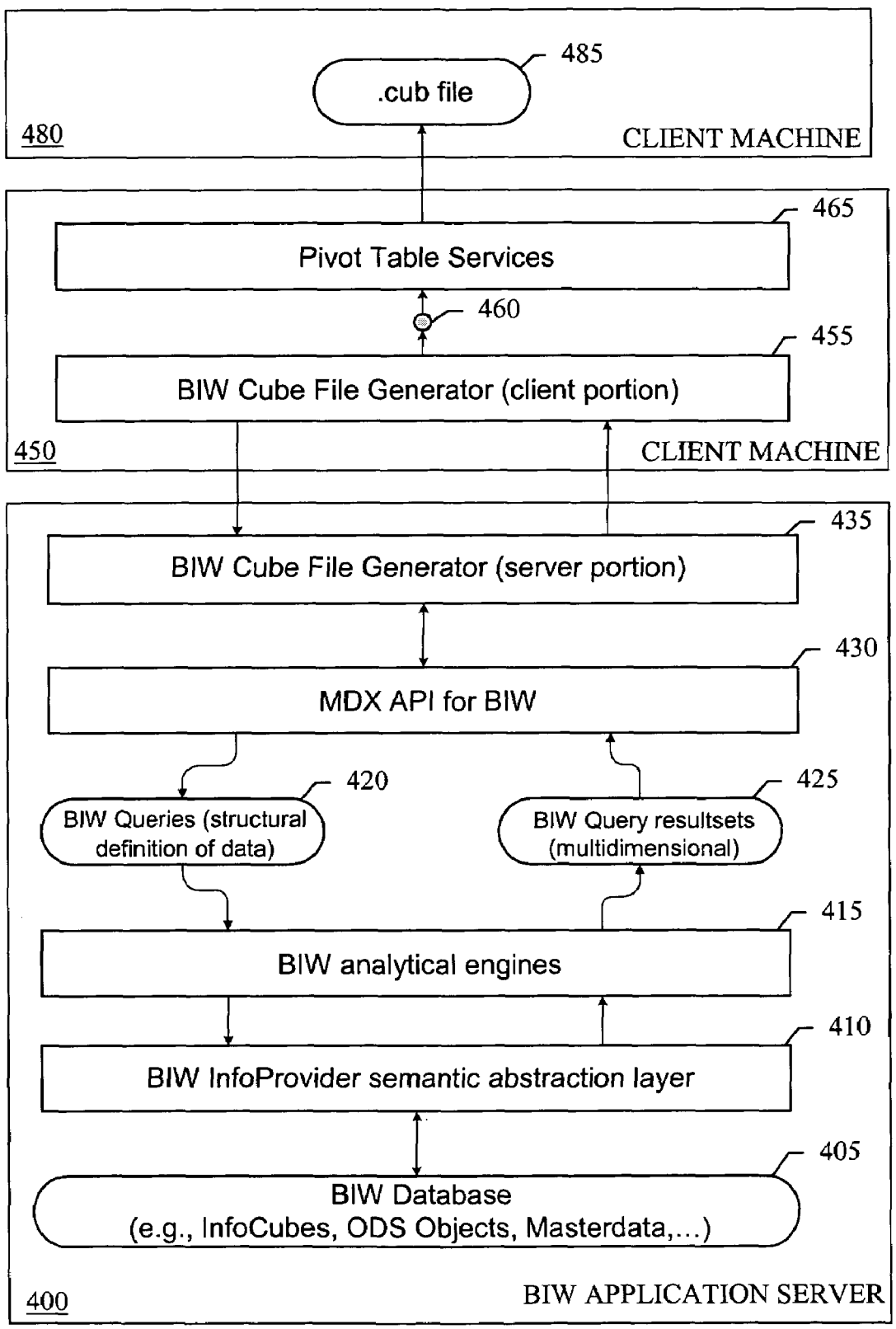
FIG. 4 is a block diagram illustrating components of a local data repository generation system according to an example implementation.

FIG. 4 is a block diagram illustrating components of a local data repository generation system according to an example implementation. A BIW application server 400 includes a BIW database 405 (e.g., InfoCubes, ODS Objects, masterdata, . . . ). A BIW information provider semantic abstraction layer 410 interfaces with the BIW database 405 and with BIW analytical engines 415. A server portion of a BIW cube file generator 435 receives and responds to requests from a client portion of a BIW cube file generator 455 in a client machine 450 (e.g., a computer running a Windows® operating system). The server portion of the BIW cube file generator 435 interfaces with an MDX API (Application Program Interface) for BIW 430, resulting in submission of BIW queries 420, which are structural definitions of data, and receipt of BIW query results 425, which are multidimensional resultsets.

The client and server portions of the BIW cube file generator 435, 455 together represent an extraction layer for a business information warehouse system. This extraction layer transforms results of BIW queries to make those results look like a relational data source. This extraction layer can be updated when the BIW system is updated, and data consistency can be maintained during the data extraction process, which may not be the case if underlying databases are accessed directly by a third party application.

Metadata and data 460 are provided to pivot table services 465 running in the client machine 450. The pivot table services 465 can create a local cube on another client machine 480. For example, the data from the BIW system can be translated into a cub file 485 using the Pivot Table Services (PVTS) provided by Microsoft Corporation of Redmond, Wash.

The metadata and data 460 can be provided in two stages. First, the metadata can be obtained and transferred to the BIW cube file generator 455, which can create an empty local data repository based on the metadata using the pivot table services 465. Second, an MDX extraction statement can be generated based on the analysis query, including any filter conditions of the analysis query, and applied in the BIW. The data results of the MDX extraction statement can be transferred to the BIW cube file generator 455 (e.g., in the form of a record set that is a formatted memory buffer), and the data results can then populate the empty local data repository using the pivot table services 465.

Figure 5:
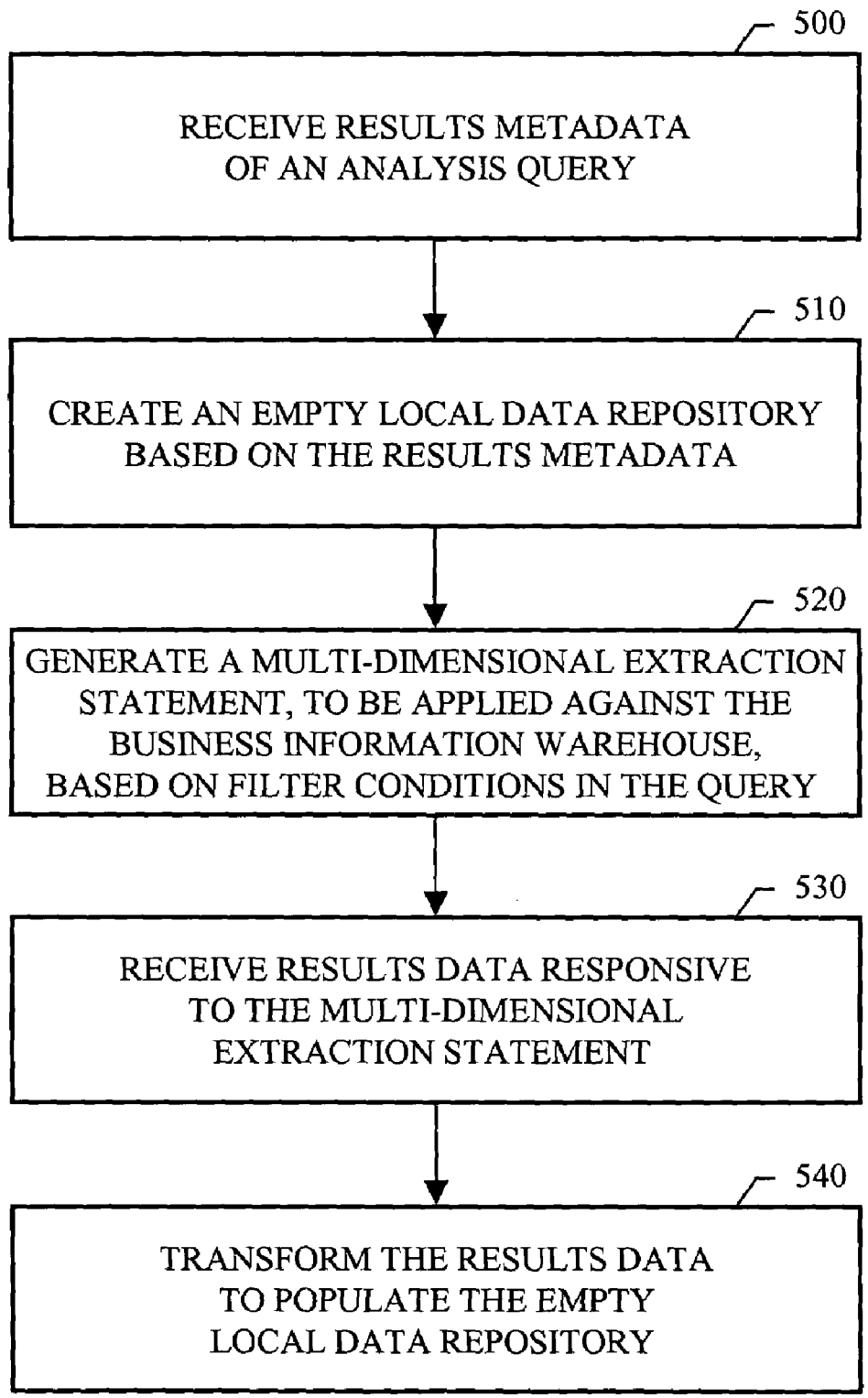
FIG. 5 is a flow chart illustrating generation of a local data repository according to an example implementation.

FIG. 5 is a flow chart illustrating generation of a local data repository according to an example implementation. Results metadata of an analysis query in a BIW are received at 500. An empty local data repository is created based on the results metadata at 510. A multidimensional extraction statement, to be applied against the business information warehouse, is generated based on filter conditions in the analysis query at 520. Results data responsive to the multidimensional extraction statement are received at 530. The results data are transformed to populate the empty local data repository at 540.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refer to any computer program product, apparatus and/pr device (e.g., magnetic discs, optical disks, memory, Programmable Logic Devices (PLDs)) used to provide machine instructions and/or data to a programmable processor.

Although only a few embodiments have been described in detail above, other modifications are possible. The described systems and techniques can be used in a landscape with any business analytics application. The logic flows depicted in FIGS. 2 and 5 do not require the particular order shown, or sequential order, to achieve desirable results. In certain implementations, parallel processing may be preferable.

Other embodiments may be within the scope of the following claims.

What is claimed is:

1. A machine-implemented method comprising:
receiving results of an analysis query applied against a business information warehouse, the analysis query applied against the business information warehouse comprising a structural definition of a multidimensional data analysis subspace of data from the business information warehouse, the results comprising at least one key performance indicator generated in response to the analysis query by an analytical engine of the business information warehouse from other information stored in underlying databases of the business information warehouse;

transforming the received results according to the structural definition such that the transformed results resemble information to be obtained directly from an underlying relational database source; and sending the transformed results to a software component that generates from the transformed results a local data repository at a client separate from the server associated with the business information warehouse, the local data repository comprising a self describing collection of integrated records, wherein the local data repository supports dynamic analytical processing operations on the results of the analysis query;

the receiving, transforming and sending further comprising:
receiving results metadata of the analysis query;
creating an empty local data repository based on the results metadata;
generating a multidimensional extraction statement, to be applied against the business information warehouse, based on filter conditions in the analysis query;
receiving results data responsive to the execution of the multidimensional extraction statement; and
transforming the results data to populate the empty local data repository.

2. The method of claim 1 further comprising: obtaining metadata from the business information warehouse using a first component of a cube file generator, the first component located at a business information warehouse application server; and creating an empty local data repository based on the obtained metadata, the created empty local data repository created using a second component of the cube file generator, the second component located at a client.

3. The method of claim 2 further comprising applying the analysis query against the business information warehouse by applying the analysis query to an information provider in a business information warehouse server to generate multiple database queries, the information provider comprising a structural definition of information stored in underlying relational databases of the business information warehouse, wherein the analytical engine comprises at least a portion of an online analytical processing component of the business information warehouse server, and application of the analysis query to the information provider comprises calling a business application programming interface provided by the information provider.

4. The method of claim 1, wherein the local data repository comprises a defined local data-mart format supported by multiple client-side business information reporting tools.

5. The method of claim 4, wherein the defined local data-mart format comprises a local cube format, and at least one of the multiple client-side business information reporting tools comprises a spreadsheet application.

6. The method of claim 1, wherein said transforming comprises transforming the results if a multidimensional data analysis subspace defined by the analysis query falls below a defined threshold.

7. A system comprising:
one or more computers processors operable to implement software modules comprising:
a business information warehouse comprising an analytical engine and an information provider; and
a local repository generator that applies an analysis query, the analysis query comprising a structural definition of a multidimensional data analysis subspace of data from the business information warehouse, against the business information warehouse through the analytical engine and the information provider, receives multidimensional results of the analysis query, and generates a multidimensional local data repository by transforming the multidimensional results into a relational data source format used by a software component corresponding to a format of the multidimensional local data repository, the local data repository comprising a self describing collection of integrated records, wherein the local data repository supports dynamic analytical processing operations on the results of the analysis query, wherein the multidimensional results comprise at least one key performance indicator generated in response to the analysis query by the analytical engine from other information stored in the underlying relational databases of the business information warehouse, the local repository generator transforming the multidimensional results in separate stages, a first stage comprising creating an empty local data repository based on received results metadata of the analysis query; generating a multidimensional extraction statement, to be applied against the business information warehouse, based on filter conditions in the analysis query; receiving results data responsive to the execution of the multidimensional extraction statement, and a second stage comprising transforming results data to populate the empty local data repository.

8. The system of claim 7, wherein the business information warehouse comprises a business information warehouse server, and the local repository generator comprises a server portion in the business information warehouse server and a client portion in a client machine.

9. The system of claim 8, further comprising back-end data source systems, wherein the underlying relational databases comprise relational data tables maintained in the business information warehouse server and in at least one of the back-end data source systems.

10. The system of claim 7, wherein the business information warehouse comprises multiple information providers including InfoCubes and ODS objects.

11. The system of claim 7, wherein the local repository generator transforms the multidimensional results only if a multidimensional data analysis subspace defined by the analysis query falls below a defined threshold.

12. The system of claim 11, wherein the local data repository comprises a defined local data-mart format supported by multiple client-side business information reporting tools, including a spreadsheet application.

13. The system of claim 12, wherein the local repository generator comprises a web service.

14. An article comprising a machine-readable storage medium device storing instructions operable to cause one or more machines to perform operations comprising:
receiving results of an analysis query applied against a business information warehouse, the analysis query applied against the business information warehouse comprising a structural definition of a multidimensional data analysis subspace of data from the business information warehouse, the results comprising at least one key performance indicator generated in response to the analysis query by an analytical engine of the business information warehouse from other information stored in underlying databases of the business information warehouse;

transforming the received results according to the structural definition such that the transformed results resemble information to be obtained directly from an underlying relational database source; and sending the transformed results to a software component that generates from the transformed results a local data repository at a client separate from the server associated with the business information warehouse, the local data repository comprising a self describing collection of integrated records, wherein the local data repository supports dynamic analytical processing operations on the results of the analysis query, the receiving, transforming and sending further comprising:

receiving results metadata of the analysis query;

creating an empty local data repository based on the results metadata;

generating a multidimensional extraction statement, to be applied against the business information warehouse, based on filter conditions in the analysis query;

receiving results data responsive to the execution of the multidimensional extraction statement; and transforming the results data to populate the empty local data repository.

15. The article of claim 14 further comprising: applying the analysis query against the business information warehouse by applying the analysis query to an information provider in a business information warehouse server to generate multiple database queries, the information provider comprising a structural definition of information stored in underlying relational databases of the business information warehouse.

16. The article of claim 15, wherein the analytical engine comprises at least a portion of an online analytical processing component of the business information warehouse server, and application of the analysis query to the information provider comprises calling a business application programming interface provided by the information provider.

17. The article of claim 14, wherein the local data repository comprises a defined local data-mart format supported by multiple client-side business information reporting tools.

18. The article of claim 17, wherein the defined local data-mart format comprises a local cube format, and at least one of the multiple client-side business information reporting tools comprises a spreadsheet application.

19. The article of claim 14, wherein said transforming comprises transforming the results if a multidimensional data analysis subspace defined by the analysis query falls below a defined threshold.

* * * * *